United States Patent
Stinessen et al.

(10) Patent No.: US 9,566,542 B2
(45) Date of Patent: Feb. 14, 2017

(54) METHOD AND A DEVICE FOR LIQUID TREATMENT WHEN COMPRESSING A WELL FLOW

(71) Applicant: Aker Subsea AS, Lysaker (NO)

(72) Inventors: Kjell Olav Stinessen, Oslo (NO); Geir Inge Olsen, Oslo (NO)

(73) Assignee: Aker Subsea AS, Lysaker (NO)

( * ) Notice: Subject to any disclaimer, the term of this patent is extended or adjusted under 35 U.S.C. 154(b) by 226 days.

(21) Appl. No.: 14/313,548

(22) Filed: Jun. 24, 2014

(65) Prior Publication Data
US 2014/0366723 A1 Dec. 18, 2014

Related U.S. Application Data

(62) Division of application No. 13/143,911, filed as application No. PCT/NO2010/000008 on Jan. 7, 2010, now Pat. No. 8,814,990.

(51) Int. Cl.
| | | |
|---|---|---|
| *B01D 53/14* | (2006.01) | |
| *B01D 45/00* | (2006.01) | |
| *E21B 43/34* | (2006.01) | |
| *F04D 25/06* | (2006.01) | |
| *F04D 29/70* | (2006.01) | |

(Continued)

(52) U.S. Cl.
CPC ............... *B01D 45/00* (2013.01); *E21B 43/34* (2013.01); *F04D 25/0686* (2013.01); *F04D 29/705* (2013.01); *F04D 31/00* (2013.01); *F17D 1/005* (2013.01)

(58) Field of Classification Search
CPC ...... B01D 45/00; E21B 43/34; F04D 25/0686; F04D 29/705; F04D 31/00; F17D 1/005
See application file for complete search history.

(56) References Cited

U.S. PATENT DOCUMENTS 3,960,525 A * 6/1976 Coggins ............. B01D 19/0021
  55/320
4,260,563 A * 4/1981 Brulhet .................. B01D 47/10
  239/545

(Continued)

FOREIGN PATENT DOCUMENTS

| EP | 2092972 A1 | 8/2009 |
|---|---|---|
| GB | 2055978 A | 3/1981 |

(Continued)

OTHER PUBLICATIONS

Oxford Dictionary definition of "funnel" pdf (accessed Sep. 23, 2013).*
Dr. Najam Beg, "The Applications of Surface Jet Pump Technology to Increase Oil & Gas Production" (2011).*
English translation of RU 2365750 C1 pdf (accessed Sep. 23, 2013).*

(Continued)

*Primary Examiner* — Duane Smith
*Assistant Examiner* — Cabrena Holecek
(74) *Attorney, Agent, or Firm* — Schwegman Lundberg & Woessner, P.A.

(57) ABSTRACT

A device for separating liquid from gas in a well flow when compressing the well flow comprises a liquid separator (1') having an inlet (13) for the well flow, an outlet (5) for gas and an outlet (4) for liquid. According to the invention separated liquid from the liquid separator (1') is fine-divided in connection with the liquid outlet (4), and the fine-divided liquid is supplied into the gas outlet (5) at a mixing point (8) downstream the liquid separator (1') and upstream a compressor (11).

22 Claims, 11 Drawing Sheets

(51) Int. Cl.
*F04D 31/00* (2006.01)
*F17D 1/00* (2006.01)

(56) References Cited

U.S. PATENT DOCUMENTS

| | | | | |
|---|---|---|---|---|
| 4,702,758 | A * | 10/1987 | Geer | B01D 9/0068 137/13 |
| 7,434,621 | B2 | 10/2008 | Aarvik et al. | |
| 7,516,794 | B2 | 4/2009 | Gramme et al. | |
| 8,147,575 | B2 * | 4/2012 | Lucas | B01D 45/12 55/337 |
| 8,814,990 | B2 | 8/2014 | Stinessen et al. | |
| 2002/0088872 | A1 * | 7/2002 | Hagiwara | B05B 7/1431 239/74 |
| 2005/0072301 | A1 * | 4/2005 | Baciu | B01D 53/002 95/258 |
| 2007/0158075 | A1 * | 7/2007 | Beg | E21B 43/124 166/370 |
| 2012/0103188 | A1 | 5/2012 | Stinessen et al. | |

FOREIGN PATENT DOCUMENTS

| | | | | |
|---|---|---|---|---|
| GB | 2198054 | A | 6/1988 | |
| NO | WO 2007004886 | A1 * | 1/2007 | B08B 9/00 |
| RU | 2060381 | C1 | 5/1996 | |
| RU | 2003132883 | | 4/2005 | |
| RU | 2293843 | C2 | 2/2007 | |
| RU | 2319000 | C2 | 3/2008 | |
| RU | 2334082 | C2 | 9/2008 | |
| RU | 2365750 | C1 | 8/2009 | |
| RU | 2365750 | C1 * | 8/2009 | E21B 47/10 |
| SU | 996720 | A1 | 2/1983 | |
| SU | 1472632 | A1 | 4/1989 | |
| WO | WO-2004016907 | | 2/2004 | |
| WO | WO-2004057153 | A1 | 7/2004 | |
| WO | WO-2005026497 | A1 | 3/2005 | |
| WO | WO-2007004886 | A1 | 1/2007 | |

OTHER PUBLICATIONS

English translation of RU 2365750 C1 claims.
"U.S. Appl. No. 13/143,911, Examiner Interview Summary mailed Dec. 4, 2013", 3 pgs.
"U.S. Appl. No. 13/143,911, Non Final Office Action mailed Oct. 16, 2013", 27 pgs.
"U.S. Appl. No. 13/143,911, Notice of Allowance mailed Apr. 21, 2014", 12 pgs.
"U.S. Appl. No. 13/143,911, Response filed Jul. 29, 2013 to Restriction Requirement mailed May 29, 2013", 9 pgs.
"U.S. Appl. No. 13/143,911, Response filed Jan. 31, 2014 to Non Final Office Action mailed Oct. 16, 2013", 19 pgs.
"U.S. Appl. No. 13/143,911, Restriction Requirement mailed May 29, 2013", 10 pgs.
"International Application Serial No. PCT/NO2010/000008, International Preliminary Report on Patentability completed Apr. 19, 2011", 35 pgs.
"International Application Serial No. PCT/NO2010/000008, International Search Report mailed Apr. 14, 2010", 3 pgs.
"International Application Serial No. PCT/NO2010/000008, Response filed Nov. 5, 2010 to International Search Report and Written Opinion mailed Apr. 14, 2010", 5 pgs.
"International Application Serial No. PCT/NO2010/000008, Written Opinion mailed Apr. 14, 2010", 6 pgs.
"Oxford Dictionary definition of "funnel"", accessed Mar. 2013.
"Russian Application Serial No. 2011133075/03, Office Action dated Oct. 3, 2012", (English Translation), 2 pgs.
"Russian Application Serial No. 2011133075/03, Office Action mailed May 20, 2013", (w/ English Translation), 6 pgs.
"Russian Application Serial No. 2011133075/03, Response filed Apr. 22, 2013 to Office Action mailed Oct. 3, 2012", (w/ English Translation of Amended Claims), 16 pgs.
Beg, Najam, "", (Sep. 27, 2011), 4 pgs.
Beg, Najam, "The Applications of Surface Jet Pump Technology to Increase Oil & Gas Production", Sep. 2011.
Martinov, V. N., "New technique for generaton of liquid and gas injection in oil production", (2004), 262-263.

\* cited by examiner

METHOD AND A DEVICE FOR LIQUID TREATMENT WHEN COMPRESSING A WELL FLOW

RELATED APPLICATIONS

This application is a divisional application of U.S. patent application Ser. No. 13/143,911, filed Oct. 27, 2011, which application is a nationalization under 35 U.S.C. 371 of PCT/NO2010/000008, filed Jan. 7, 2010 and published as WO 2010/080040 A1 on Jul. 15, 2010, which claimed priority to Norwegian Patent Application No. 20090106, filed Jan. 8, 2009, and Norwegian Patent Application No. 20093195, filed Oct. 22, 2009; which applications and publication are incorporated herein by reference in their entirety.

The present invention maintains the content of liquid under an acceptable level while the droplet size is reduced to below the acceptable level for gas flowing into a well flow compressor. Further, in front of a gas inlet of the compressor the separated and collected liquid is fed from a liquid separator in the form of a fine spray of small droplets into the inflowing gas using compressed gas from the compressor to operate an ejector or eductor, hereinafter the ejector and eductor are include in the common term as ejector, possibly combined with an atomizer nozzle. Alternatively to a compressed gas ejector or eductor for pumping the liquid, an adjustable or fixed choking can be utilized inside the outlet pipe for gas from the liquid separator which provides for sufficient under pressure to operate a possible atomizer nozzle. Yet another variant is using at least one atomizing nozzle for fine-dividing the separated liquid before return into the gas from the liquid separator.

To protect compressors against unacceptable inflow of liquid which can also contain sand and other particles, hereinafter included in the common term sand, a liquid separator is often included upstream the compressor. Thereby, liquid and sand can be collected, whereby gas and liquid with sand thereafter can be compressed or pumped on their own.

Such a protection of subsea compressors against too large inflow of liquid and sand is previously known and is often effected by situating a liquid separator upstream the compressor, whereby liquid and sand can be separated from the well flow, collected and pumped into a gas conveyor at a point downstream the compressor, possibly that the liquid is guided in a particular pipe.

Liquid separators involve in this context inter alia separators, scrubbers, cyclones and liquid slug collectors all in addition to the separator itself having a volume for collected liquid. This collecting volume will be determined by more factors such as:

Average liquid content in the well flow gas. This varies substantially dependent on whether the well flow gas is from a dry gas field or gas condensate field. A field dependent variation from 0.01% by weight or less to 5% by weight or more can be expected without giving any other effects for the invention than the practical dimensioning and operation. In multiphase pumping from oil fields, the liquid proportion amounts typically from 2% by volume to 30% by volume.

Liquid lump volume, i.e. the volume of liquid accumulations flowing in the pipe and being too large to be denoted droplets but too small to be denote liquid slugs. It is presupposed that liquid lumps can be of "fist size". In the term liquid lump is also included whatever being denoted "surge" in English language, i.e. variation in liquid inflow due to variations in the gas production through the pipe upstream a compressing system.

Liquid slug volume, i.e. the volume of a liquid accumulation caused by various conditions in the pipe system upstream the compressor and is flowing into liquid separator during few seconds.

To illustrate disadvantages of the prior art solutions, an ordinary fashion is described in the following for the drainage of liquid from a subsea liquid separator with an associated volume for liquid collection. Hence, it is referred to FIG. 1 illustrating the main equipment of such conventional subsea compressing and pumping stations. In Table 1 the components are indicated by letters from the respective figures.

TABLE 1

| | |
|---|---|
| a | Liquid separator with collection volume in common vessel |
| b | Compressor |
| b' | Compressor motor |
| c | Pump |
| c' | Pump motor |
| d | Lower allowable adjusting level for liquid |
| e | Upper allowable adjusting level for liquid at stable flow |
| f | Highest liquid level, determined by liquid slug volume |
| g | Fine-cleaning equipment, e.g., cyclones |
| g' | Lower edge of fine-cleaning equipment |
| h | Downpipe for liquid from fine-cleaning equipment |
| i | Outlet from downpipe |
| j | Anti-surge valve with actuator |
| k | Anti-surge cooler |
| l | Cable for supply of electric power to compressor motor |
| m | Cable for supply of electric power to pump motor |
| n | Liquid recirculation pipe |
| o | Gas recirculation pipe |
| p, p', p'', p''' | Shut-off valves |
| q | Electric connector for compressor motor |
| q' | Electric connector for pump motor |
| r | Liquid circulation valve |

During normal operation, all of the shut-off valves illustrated, p to p''', are open and the anti-surge valve, j, is closed. At a given moment the compressor, b, is driven by a specific speed to effect a desired gas production. The compressor is driven by the electric motor, b', having electric power through the cable, l, coupled to the compressor motor by an electric connector, q. Correspondingly, the pump is supplied with electric power through the cable, m, and connector, q'.

The gas flowing from the reservoir well, i.e. the wet gas or well flow into the liquid separator with its collection volume, a, contains a certain average liquid content in given conditions capable of being disturbed by a "surge" or in worst cases a temporary liquid slug having a large liquid content and low duration. It is important to note that more such liquid slugs are infrequently arriving in rapid succession during the operation because the gas over a certain period has a given average liquid content.

BRIEF DESCRIPTION OF THE DRAWINGS

In FIG. 1, there is presupposed certain allowable liquid levels, from d to f, within the liquid separator. When the pump is a centrifugal pump which can generate bubbles, the lower level, d, is determined in that the pump requires a minimum head for a lower liquid level, d, relatively to the suction into the pump, c. The need of head, i.e. "NPSHR"—Net Positive Suction Head Required—varies dependent of pump construction and operational conditions, in particular the speed, but can amount to from 3 to 4 m, for instance. The lower liquid level, d, must also be sufficiently high to prevent that the pump entraps free gas in the liquid flow thereof. Such centrifugal pumps are sensitively to free gas, as the pumping effect, i.e. the capacity to generate pressure rise and capacity decreases along with the efficiency, and the need of working power increases. An ordinary rule is that the free gas therein should be maintained lower than 3% by volume. When the requirement for NPSHR is satisfied, this is also fulfilled automatically.

Figure 1:
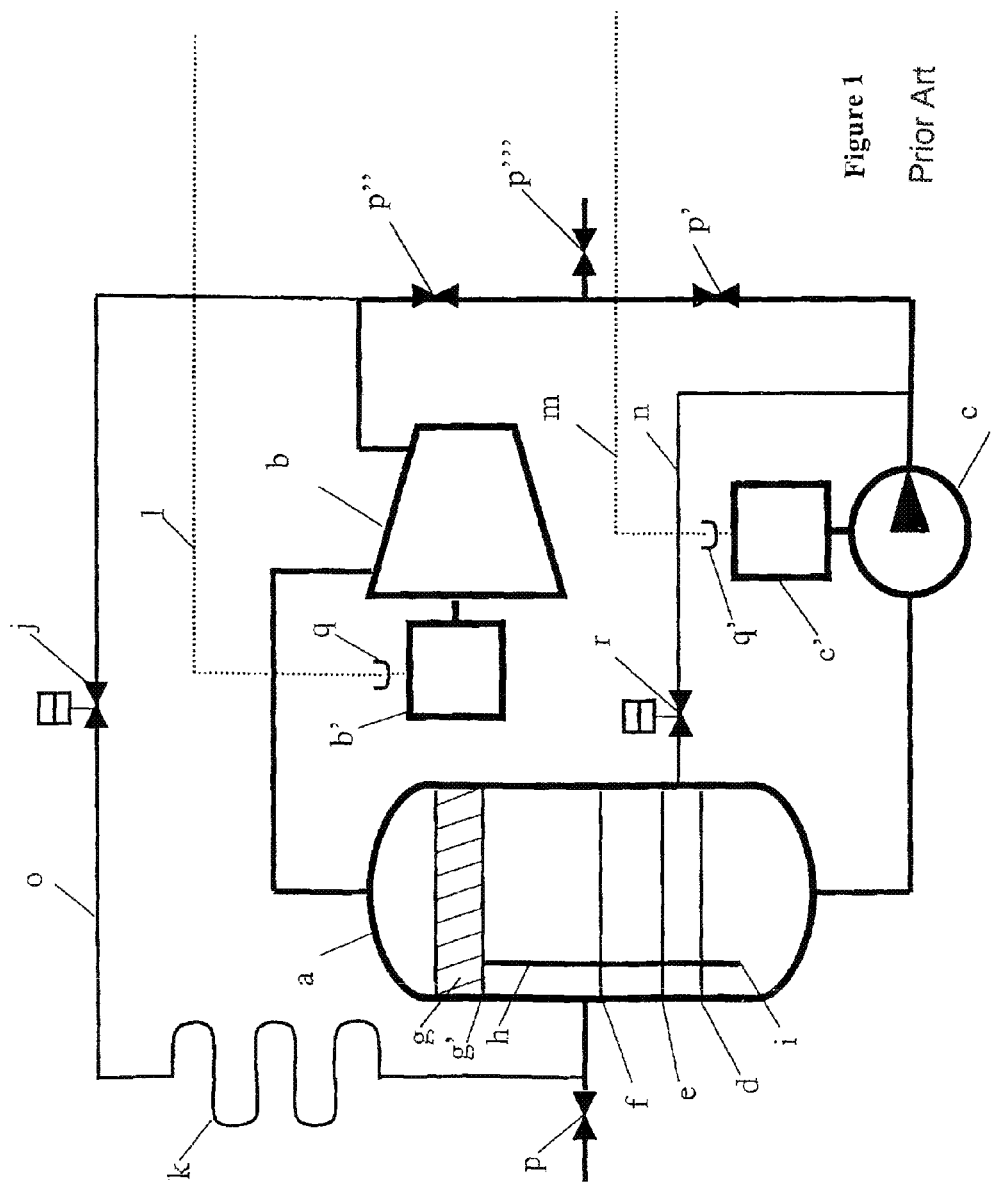
FIG. 1 shows a conventional system.

Further, the highest allowable normal liquid level, e, at stable flow is determined by the safety against entrainment of too large liquid quantities along with the gas and being directed into the compressor when the largest liquid slug, i.e. the design slug is added to the upper allowable level, e, at stable flow. The highest liquid level, f, is determined in that "the largest liquid slug"—given by calculations, measurement or empirically—is to be accommodated at the top of the upper normal liquid level, e, without exceeding the absolute upper allowable highest liquid level, f. It should be noted that the absolute highest liquid level, f, regarding a location of the fine-cleaning equipment, g, when it is used cyclones or other fine-cleaning equipment needing a downpipe, h, for drainage, is determined by the pressure drop over the fine-cleaning equipment arranged in an upper portion of the liquid separator, a. The length of the downpipe, h, from a lower edge, g', of the fine-cleaning equipment down to the highest allowable liquid level, f, has to be provide for a sufficient static pressure to drain the fine-cleaning equipment often being cyclones with a pressure drop in the range of 0.1 to 0.5 bar. Moreover, an outlet, i, of the downpipe, h, always has to be submerged in the liquid which prevents gas from being drawn through the downpipe, h. This involves that the outlet, i, has to be located below the lower allowable liquid level, d.

If more simple equipment, e.g. wire mats, effects satisfactory fine-cleaning and hence droplet removal, the height, g, between the fine-cleaning equipment and the highest liquid level, f, can be reduced because a downpipe is then unnecessary. The mechanism providing that liquid droplets are catched within wire mats and the like, is due the droplet being merged and achieve a size making them to drop down through rising gas towards the wire mats, i.e. the rate of fall for the droplets is larger than the gas velocity upwards.

What constitutes "unduly high" liquid and sand load for the compressor depends on how robust the construction is in this regard and the choice of materials and any protective coating against erosion on the compressor impellers. Rare and short-term large liquid load, e.g. 15% by volume, can centrifugal compressors resist provided that the droplet diameter is not too large, i.e. typically smaller than 100 µm. Compressor suppliers also state that conventional compressors allow continuous running with liquid, provided that the content of liquid is less than 3% by weight. Other suppliers of centrifugal compressors state that conventional compressors withstand continuous running with up to 3% by volume of liquid in the inlet and droplets smaller than 50 µm, with acceptable erosion and lifetime.

To increase the tolerance of centrifugal compressors, some compressor supplier have developed in recent years new solutions with continuous operation at large liquid content which still which is in progress. In particular, the motivation is to be able of simplifying compression or "boosting" of the well flow from gas fields compared to the system in FIG. 1.

During operation, the pump having the conventional solution is so controlled that the level within the liquid separator is kept between an upper liquid level, e, and the lower level, d. Then, it is usually adjusted towards an "ideal level" somewhere between d and e. This is a level determined both to protect the pump against bubble formation and entrainment of free gas, and while being sufficiently low to prevent liquid entrainment into the compressor.

The liquid separated within the liquid separator, a, is collected in the collection volume thereof. In prior art solutions, the pump, c, is presupposed as a centrifugal pump. These pumps are particularly suited for pumping when the liquid production in cubic meter per hour, $m^3/h$, not is too low, whereby the pumps then are constructed for the pressure rise needed. Typically, the requirement for pressure rise varies from 5 bar to 100 bar and even more.

As an example to illustrate the problem involved with known solutions, a typical situation can be selected in which a minor gas field only needs one compressor, and wherein the liquid production is 10 $m^3$/day, namely 0.4 $m^3/h$. In the actual example, this corresponds to a liquid content of the gas at approximately 0.01% by volume and a need of pressure rise of 30 bar from suction pressure being 10 bar. There are not available centrifugal pumps that with continuous operation can comply with such a low requirement for volume flow and having the pressure rise needed. A solution for continuous operation of the pump can involve recirculation of almost the entire liquid quantity, whereby a minimal liquid flow into the pump is achieved, e.g. 50 $m^3/h$.

By comparing what centrifugal compressors already can resist, and what these in near future can be expected to withstand as a result of the actual development of a liquid load relatively to the liquid content of fields having gas or a mixture of gas and condensate as mentioned above, centrifugal compressors can theoretically be run without a liquid separation of the gas. This presupposes that the liquid flows smoothly and fine-divided in the gas. This condition can be considered as correct for the main part of operational hours for a subsea compressor but the situation is occasionally disturbed by larger liquid concentrations in the form of "surges" with liquid lumps or in worst cases fill the entire pipe cross-section. The mechanisms resulting in generation of liquid lumps or liquid slugs are typically variations, i.e. transients inducing a liquid accumulation, e.g. at start-up or close-down of one of more wells at a subsea template. Possibly, the worst case is start-up of the wells at a subsea template, in which all of the wells have been closed down over a period. Then, a lot of liquid can be accumulated and flowed against the compressor. To avoid that the liquid separator has to be dimensioned to handle the entire transient liquid slug which can arise at the start-up, it can be developed particular start-up procedures. For example, the liquid slug can be routed either outside the compressor in a specific bypass pipe, or run in batches through the liquid separator.

The present invention ensures that all liquid from the well flow is directed into the compressor during operation, whereby the large, control and cost demanding separation pump and compression system in FIG. 1 can be substantially simplified.

For the compressor, it thus is its robustness against liquid and sand that determines the construction of the gas processing part of the liquid separator, and similarly it is the robustness of the pump as regards bubble formation and entrained gas determining the design of the liquid processing part. As regards a setting of the accuracy and complexity of the level control, the same robustness is also of particular large importance.

Figure 2:
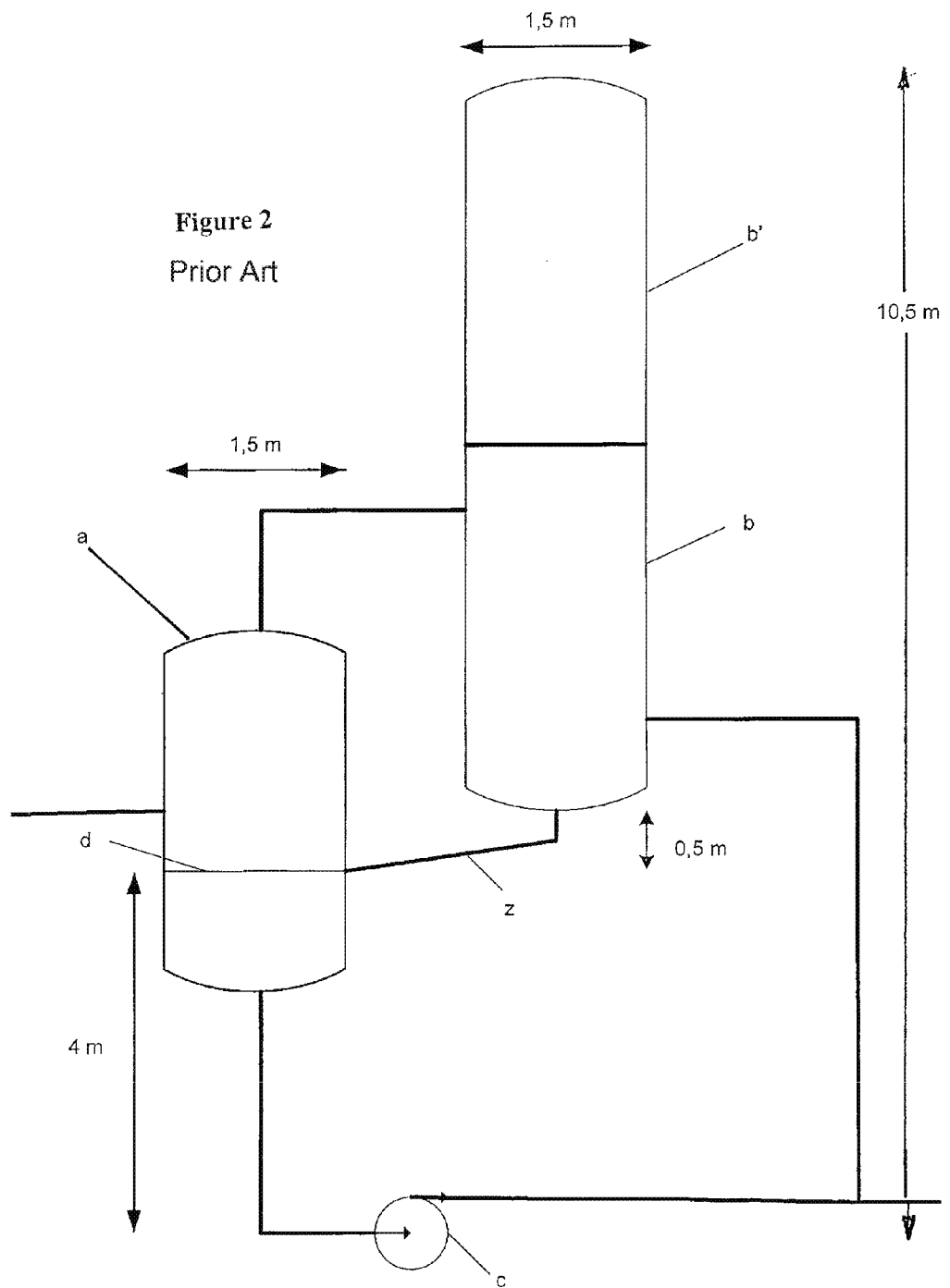
FIG. 2 shows the conventional system of FIG. 1 including components to illustrate the need of height.

In FIG. 2 there is illustrated how the use of centrifugal pump increases the overall height of the pump and liquid separator with its collection volume to comply with the NPSHR. In the example, there is shown that a difference in altitude between the lowest liquid level and suction of the pump is 4 m.

To determine the overall height of the arrangement made from the compressor, liquid separator/collector and pump, it has to be taken into account that the compressor and/or compressor motor can be in need of drainage. By known solutions, the force of gravity is used for drainage. To achieve drainage by the force of gravity, a lower portion of the compressor must be situated approximately 0.5 m above a lower level within the liquid collector.

As mentioned above, the consequence of using a centrifugal pump and gravity drainage is high overall height for the total arrangement. In FIG. 2 this is presupposed by 10.5 m, for instance. A typical diameter of some components is also indicated.

By the example, there is shown a vertically oriented compressor and compressor motor. If the two components are horizontal, the overall height is reduced but at the cost of an increased width.

In FIG. 2 is merely included components needed to illustrate the need of height. Here, the symbols are the same as in FIG. 1 but in addition there is:

TABLE 2

| z | Draining pipe for compressor with compressor motor |

Hence, the main objective of the present invention is to present a simplified compressing system, i.e. a system based on a liquid tolerant compressor, namely the well flow compressor, in front having a liquid separator removing large droplets and liquid lumps from the gas before it flows into the compressor. The catched liquid is then fed into the gas flow in front of the compressor inlet pipe in such a manner that the droplet size and concentration of liquid in the gas is within what the compressor can tolerate during long-term operation. Typically, the liquid consists of a mixture of condensed water, produced water, condensate and oil with added chemicals. The mixture is very reservoir dependent. The term "within what the compressor can tolerate during long-term operation" depends on the configuration of the compressor, construction and materials selected. As mentioned, some compressor suppliers state that already existing compressors can tolerate a continuous operational condition with up to 3% by volume of liquid, provided that the droplet size is kept below a certain level, e.g. 50 μm. Further, there are compressors under development having a substantial larger liquid tolerance than this. It is important to note that it is the compressor supplier defining which maximum liquid concentration that can be tolerated by the compressor, in combination with a given maximum droplet size for continuous operation and still achieve an acceptable interval of maintenance, e.g. three years or more. The objective of the present invention is to provide for a liquid separator upstream the well flow compressor and in such a manner that a feeding of liquid into the gas into the compressor complies with demands defined for the compressor as regards the maximum liquid concentration and droplet size.

It can be mentioned that for a conventional utilization of compressors onshore and at platforms, it is normally to dimension according to a dimensioning criterion according to NORSOK P-100 being: $1.32 \times 10^{-8}$ m$^3$ liquid per sm$^3$ gas, which corresponds to the API-criterion of 01, US gallon per million scft. At a gas pressure of 100 bar, this corresponds to a liquid content in the gas of approximately 1.3 ppm-vol. As regards what the compressor suppliers indicate that centrifugal compressor can resist at continuous operation, 1.3 ppm provides for a safety factor in the order of 10000 which only is achievable by conventional, large separators and scrubbers. For liquid tolerant centrifugal compressors being used for well flow compression, therefore the NORSOK-criterion is not adequate in that it is not using the compressor ability to withstand liquid. According to the present invention, the compressor tolerance is used to provide for a device in which the liquid follows the gas into the compressor after a previous treatment that creates droplets being smaller than the maximum droplet size and the compressor resists for continuous operation and simultaneously is balancing the liquid content of the gas, whereby it is not generated peaks having a larger liquid content than the compressor at the most can withstand.

The liquid separator is to be formed in a manner allowing most of the content of liquid to follow the gas flow and only larger droplets above a certain size and liquid lumps are catched. It is the selected type of an inlet and fine-cleaning equipment (droplet catcher) in front of the gas outlet that determines the extent of droplets to be catched.

Then, the separated liquid is fed into the gas flow in front of the liquid by inlet inter alia to utilize energy from the compressor to effect the pumping work to transfer the liquid from the liquid separator into a mixing point for the gas and liquid in front of the compressor inlet. Because there is a low pressure difference between the liquid outlet of the liquid separator and the mixing point, the power demand is low. The pumping of liquid from the liquid separator to the mixing point can be performed either in that:
- compressed gas operates an ejector directing the separated liquid into the gas flow
- a constriction of the pipe with a convergent and divergent portion (venturi) in front of the inlet creates an under pressure drawing the separated liquid into the gas flow at the mixing point
- a control valve in front of the mixing point generates a desired under pressure being adjustable
- a fixed choking providing for sufficient under pressure is arranged in front of the mixing point
- at least one atomizing nozzle located in a compressor inlet
- a combination of these.

To ensure sufficient small droplets, a liquid atomizing nozzle can possibly be arranged in the pipe directing liquid from the liquid separator to the inlet pipe for gas into the compressor.

In this manner, the compression system is simplified in that the need of a pump with motor and power supply is eliminated and, thereby, the requirement of supplementary height in that the compressor takes over the pumping work.

It is also favourable that the liquid separator can be situated independent of the compressor because the pumping work to be performed by the compressor to elevate and direct the liquid into the mixing point in an inlet pipe of the compressor nevertheless is low.

Together, the invention provides for a complete equipment for well flow compression having small dimensions relatively to a conventional solution (FIGS. 1 and 2), and having a large degree of freedom as to mutual height location of the liquid separator and compressor.

The main objective of the invention preventing that liquid in too large concentrations and having too large droplet size flows into a compressor is achieved by a device for separating liquid from gas in a well flow when compressing the well flow, comprising a liquid separator having an inlet for the well flow, an outlet for gas and an outlet for liquid, wherein separated liquid from the liquid separator is fine-divided in connection with the liquid outlet, and wherein fine-divided liquid is supplied into the gas outlet at a mixing point downstream the liquid separator and upstream a compressor.

Thereby, the separated liquid can be fed into the gas pipe in front of an inlet of the processing equipment via an intermediate ejector or eductor, or by under pressure in the gas pipe, whereby energy of the compression system operates the pumping of liquid. If the desire is to create an under pressure at the mixing point for gas and liquid in front of the inlet of the compressor, this can be achieved by a suitable constriction in the pipe, with a fixed or adjustable choking, or at least one atomizing nozzle in particular located in the gas inlet pipe, before and/or after the mixing point. Even then, it is the energy of the compressor operating the drainage and potential fine-dividing of the separated liquid.

Summarized, it can be determined that regardless of using nozzles or an ejector or other components to divide the liquid into small droplets having a desired extent, it is the energy of the compressor, i.e. combination of pressure, pressure drop, and volume flow in the gas that effects the droplet generation. For example, compressed gas from the compressor outlet or one of its stages can be directed into a nozzle to assist the droplet tearing.

Favourable embodiments according to the present invention are indicated by the dependent patent claims and discussion below.

The presumption for a successful result by means of compressed gas is that the compressed gas supplied has a sufficient pressure, more precisely larger than the inlet pressure of the separator during operation, whereby there is sufficient operational power providing that the pump effect forces the separated liquid back in the gas flow in front of the compressor. Thus, the gas pressure has to enable the pumping and effect the fine-dividing of liquid lumps to small droplets.

Compressed gas to run the ejector and fine-dividing separated liquid is supplied from one of the compressor stages or its outlet. Due to low pressure difference between the liquid outlet of the liquid separator and mixing point for gas and liquid in front of the compressor, it is normally sufficient to have compressed gas from a first or second stage of the compressor. This has to be calculated from situation to situation, and it is also dependent on the requirement of liquid fine-division and, thereby, the energy needed.

If using under pressure in the gas pipe, this must be generated in that the constriction is large enough to provide for the pumping and fine-dividing effect.

A favourable embodiment of the invention is that the pumping with the ejector or choking upstream the inlet into the compressor is in a manner that the liquid separator at any moment is empty of liquid. Then, a level measurement and adjusting can totally be avoided. To achieve this, either the ejector or choking has to be set at a fixed value before installation, based on calculations of the largest liquid content of gas. During operation, there is thus no possibility to regulate the setting. Hence, it is necessary to include a sufficient margin of safety for the pumping. For instance, if calculations require that 10% of the gas flowing into the liquid separator has to be directed to the liquid outlet pipe to ensure that the liquid separator is always empty without a rise of liquid level, it can be preset at 15% as safety, for instance. This increases the power consumption a little for the ejector or choking but the consumption is nevertheless kept low relatively to the compressing work which is not an argument for restraint as regards the safety factor for pumping. It is unlikely that a large quantity of gas in the liquid outlet pipe relatively to the gas outlet pipe of the liquid separator reduces the efficiency for the liquid separator but on the contrary the safety increases as regards not getting large liquid droplets into the gas outlet pipe and further into the compressor. By selecting a relatively large ratio between gas in the two outlet pipes, this can reduce the need of inlet equipment and any fine-cleaning equipment at the gas outlet pipe, whereby internal equipment of the liquid separator can be formed as simple as possible, e.g. only with a single inlet arrangement and not any form of fine-cleaning equipment at the gas outlet pipe.

It is decisive that the separated liquid entering the liquid outlet pipe is torn to fine droplets having a selected size. It is possible that the gas following the separated liquid in the liquid outlet pipe due to collision with the largest gas quantity passing in the gas outlet pipe at the mixing point, is sufficiently to ensure such a fine-dividing. However, if there is any doubt whether this is sufficient, an atomizing nozzle can be arranged in the liquid pipe in front of the mixing point. Such atomizing nozzles are known and the nozzle can be selected in a manner that the gas quantity being set through the liquid outlet pipe along with the pressure drop in the nozzle, provides for a maximum droplet size having a given distribution of droplet sizes. Then, it is important that the ejector or choking expected to comply with the power consumption for both pumping and fine-dividing is set in a manner that the actual power needed is fulfilled without doubt. The smaller droplets selected for the setting, the lower wear of the compressor impellers due to the pulse of collision which is favourable for the lifetime of the compressor. On the other hand, the power consumption is increased. Therefore, selected dimension of the droplet size relatively to the power consumption as regards atomizing should be considered from situation to situation.

Relatively to the simplest variant having a preset pumping work and without any form of level measurement and adjustment, a possible embodiment is allowing adjustment during operation. A possibility for adjustment of the pumping work can be desirable, if uncertainties exist as regards to how the liquid content of the gas can be changed during the operational period. Then, the liquid separator can be provided with a level sensing or metering of different types, as described in the following, along with different types of level adjustment. Below, it is discussed different forms of level metering and adjustment from the most simple to the advanced.

A. The liquid level is sensed at a location in a lower portion of the liquid separator and, when it is sensed that the liquid level has reach this location, the pump effect for separated liquid from the liquid outlet pipe is increased either by in-creased admission to the ejector or by increased choking of the control valve upstream the mixing point for gas from the gas outlet pipe until a desired liquid level is restored, e.g. the liquid separator is completely emptied. This can be controlled either manually, e.g. a remote-controlled regulating valve, or automatically. For instance, the increase of pumping is effected by 10% increase until no liquid level is sensed.

B. The liquid separator includes sensors for upper and lower levels. When the liquid reach the upper level, the pumping is increased in stages having a selected set value, e.g. 10%, until liquid is not sensed at the upper level. When the lower level is restored, the pumping work is then reduced in the same fashion until the level is sensed at the top, etc.

C. The liquid separator is equipped with a continuous level measurement, e.g. nucleonic or with pressure difference, and a continuous automatic level adjustment maintaining the level between upper and lower levels.

The preferred solutions are the simplest, i.e. either that the relation between gas in the liquid outlet pipe and the gas outlet pipe has a presetting before the installation which during operation does not allow a controlled adjustment, or the solution mentioned by section A which does enable a follow-up and adjustment in a more simple manner.

However, the solution according to B and in particular C can be needed in cases having large variations in the liquid content of gas in the form of large "surges", slug flow or frequently occurring transient "slugs". Then, to avoid too large liquid content of the gas into the compressor, it can be needed that the separated liquid is given a certain retention period within the liquid separator and this can be achieved by dosing separated liquid from the liquid separator using the variants mentioned by B or C.

A dosing of a larger liquid accumulation being separated, can also be achieved without an adjustment or with the simple adjustment from section A above. This is achieved by including a certain flow resistance in the liquid outlet pipe, either in the form of a suitable narrow pipe cross-section or a constriction. Due to the flow resistance, a given period of time is then needed before the separated liquid has been transferred into the gas at the mixing point, whereby it is avoided that the gas passed into the compressor has a liquid content being too large.

Other combinations of the solutions with measurement and adjustment of the level from sections A to C are also possible.

Regardless of how large the liquid and sand concentration is, the compressor selected for the actual cases has to be constructed to resist this during a sufficient period. In some situations, three years of operation or less, for instance, can be sufficient to justify the large saving in capital costs and complexity enabled by the invention. For instance, when the compressor after three years has been eroded in a manner that the efficiency is too low to perform the compressing work needed, then the compressor is simply replaced. The intention is constructing a combined liquid separator, liquid fine-divider and liquid-tolerant compressor, whereby a replacement of the compressor can follow the intervals with reconstruction adaptable according to compressing process.

Although not be understood as a restriction, the discussion of the invention is made hereinafter in connection with a liquid separator frequently situated at a subsea localization. However, this must not be considered as any restriction for in which environments the present device is to be arranged.

In addition to operation of an ejector for pumping, the compressed gas from the compressor can inter alia also be used for flushing sand from the liquid separator to prevent sand build-ups.

As regards flushing to remove accumulated sand, the use of compressed gas effects a strong vortex motion due to pressure and expansion thereof. A location of the nozzles not being illustrated and configuration thereof can be optimized for the purpose. Hence, the objective is having sufficiently of flushing gas with high pressure for utilization. The compressed gas can be used to remove accumulated sand both from a lower portion of the liquid separator, from its inlet arrangement or potentially from a fine-cleaning stage within its upper portion.

Expansion of gas effects cooling. Therefore, it has to be determined whether the temperature can become in a range enabling hydrate formation. In such cases and according to the prior art, a hydrate inhibiting agent, e.g. MEG, DEG, TEG, methanol or correspondingly has to be injected. In most situations an additional supply of hydrate agents are hardly needed, because such an agent has already been added the well flow.

As an alternative, the liquids mentioned above can also be used for periodical sand flushing of a lower portion of the liquid separator, inlet arrangement and fine-cleaning stage. The liquid mentioned above can also periodically be supplied in i the liquid separator having such a quantity that the liquid is directed via the mixing point into the compressor to wash out deposits therein.

It is also to be mentioned that to ensure that sand is not accumulating within the liquid separator, the lower portion can have a conical configuration, e.g. with a conical insert, and that the angle of the cone is in a manner that sand is always flowing downwards and is directed out via the liquid outlet pipe.

What is making the present invention different from the prior art is the simplification by eliminating a conventional pump, e.g. a centrifugal pump having electromotor, and that a separator and scrubber are actually eliminated. In the liquid separator, there is no need of an exact level measuring, whereby the level measuring equipment can be simplified or omitted. Omission of pumps involves automatically to the advantage in that an electric power supply of the pump motor is eliminated. Further, the omission of a continuous level adjustment within the separator involves a simplification of the control system and by setting the pumping by means of an ejector or under pressure, whereby the liquid separator is empty or approximately empty at any moment the need of adjustment is totally eliminated.

By omitting pumps, in particular centrifugal pumps, the need of a certain minimal over-heigth of the liquid level to the inlet of the pump, i.e. NPSHR, is eliminated. As mentioned previously, this can amount to 4 m, for instance. In addition to saved height, it also involves a reduction of weight and size. Omission of equipment, and in particular rotating equipment, is also providing for enlarged reliability.

What allowing omission of pumps according to the present invention is that the well flow compressor takes over the pumping work and that energy from the compressor is used to direct liquid from the liquid separator back into the gas in front of the inlet of the compressor with an acceptable concentration and droplet size.

Utilization of some of the energy supplied to a subsea compressor for the pumping and fine-dividing work is a real possibility due to the fact that the power demand for the pumping of fields having gas and a mixture of gas and condensate is very low relatively to the power demand for the compression. Table 3 below indicates this by numbers for typical examples. The power demand for compression is as an estimate for the example with gas and gas-condensate 4 000 kW and 10 000 kW, respectively, and the estimate shows a power demand for pumping of 1 kW and 300 kW, respectively.

TABLE 3

|  | Gas | Gas-Condensate |
|---|---|---|
| Pump effect to compression effect | 0.03% | 3% |
| Pump effect | 1 kW | 300 kW |

Escalating the compressor and its motor to comply with the modest pumping work and draining and fine-dividing work do not represent any noticeable increase in either physical dimensions or weight and costs of these components. This represents neither a noticeable disturbance for the operation of a compressor.

Some subsea compressors utilize gas from an outlet of the compressor or intermediate stages (between an inlet and outlet) for cooling the electric motor and potentially other components in need of cooling such as any magnetic bearings. The gas used for cooling is typically 3 to 10% of the total gas rate that is compressed and after the same gas is utilized for cooling the motor or other components, it is directed back upstream the compressor so as to be recompressed. There is needed a compression power to recompress this cooling gas. Therefore, it is favourable to use the gas also as compressed gas for the liquid separator, i.e. to operate the ejector, atomizing nozzle and sand flushing as described for the present invention.

It can be indicated that for multiphase pumping of a mixture of gas, oil and water, and in which the liquid quantity amounts to 5-20% by volume, the portion of the power totally supplied to the multiphase pump being used for liquid pumping is often substantially lower than the quantity used for gas compression, e.g. 20%. Note that the present invention is not merely applicable for a flow of gas or a mixture of gas and condensate but also for multiphase pumping, for instance. If compressors having large liquid tolerance are developed, the invention can also enable the use of compressors in situations in which multiphase pumps are now used. Then, the practical question is whether multiphase pumping according to the invention is more favourable than a conventional multiphase pumping.

Compared to the conventional drainage of a subsea liquid separator with an associated liquid collection volume and level control when pumps are used for the draining, the present invention provides for a substantial simplification and in addition reduced constructional dimensions.

Now, the invention is to be explained in detail by means of preferred embodiments shown in the drawings, in which:

FIG. 1 shows schematically a conventional subsea system for compression of gas;

FIG. 2 illustrates schematically a typical height and diameter of a conventional solution with subsea gas compression by means of a compressor, separator and centrifugal pump according to the example for gas above, cf. Table 3;

In Table 4 there is specified reference numerals utilized to discuss and detail the invention by means of the FIGS. 3 to 11.

TABLE 4

| 1 | Liquid separator container |
|---|---|
| 1' | Liquid separator |
| 1" | Cyclone |
| 2 | Inlet arrangement |
| 3 | Fine-cleaning equipment, droplet trap |
| 4 | Liquid outlet pipe |
| 5 | Gas outlet pipe |
| 6 | Choke valve, fixed or adjustable |
| 7 | Fixed choking in the form of pipe restriction, e.g., venture |
| 8 | Mixing point for liquid and gas |
| 9, 9', 9" | Liquid atomizing nozzle |
| 10 | Compressor inlet pipe |
| 11 | Well flow compressor |
| 12 | Compressor motor |
| 13 | Well flow inlet pipe |
| 14 | Well flow outlet pipe |
| 15 | Ejector or educator |
| 16 | Pipe for propellant gas to ejector or educator from a compressor stage or outlet |
| 17 | Pipe for cooling gas for motor as propellant gas to ejector or educator |
| 18 | Level sensor for liquid, either one or more points, or continuous |
| 19 | Valve |
| 20 | Valve |
| 21 | Valve |
| 22 | Downfunnel for liquid |

Note that all equipment mentioned by Table 4 is only what being considered necessary to detail the invention and function thereof. For a practical operation, further additional components can be present such as e.g. an anti-surge line with cooler and control valve, nonreturn valves, pressure and temperature sensors, etc.

In the following, the manner of operation for the invention is to be explained by means of Table 4 and FIGS. 3 to 11.

Figure 3:
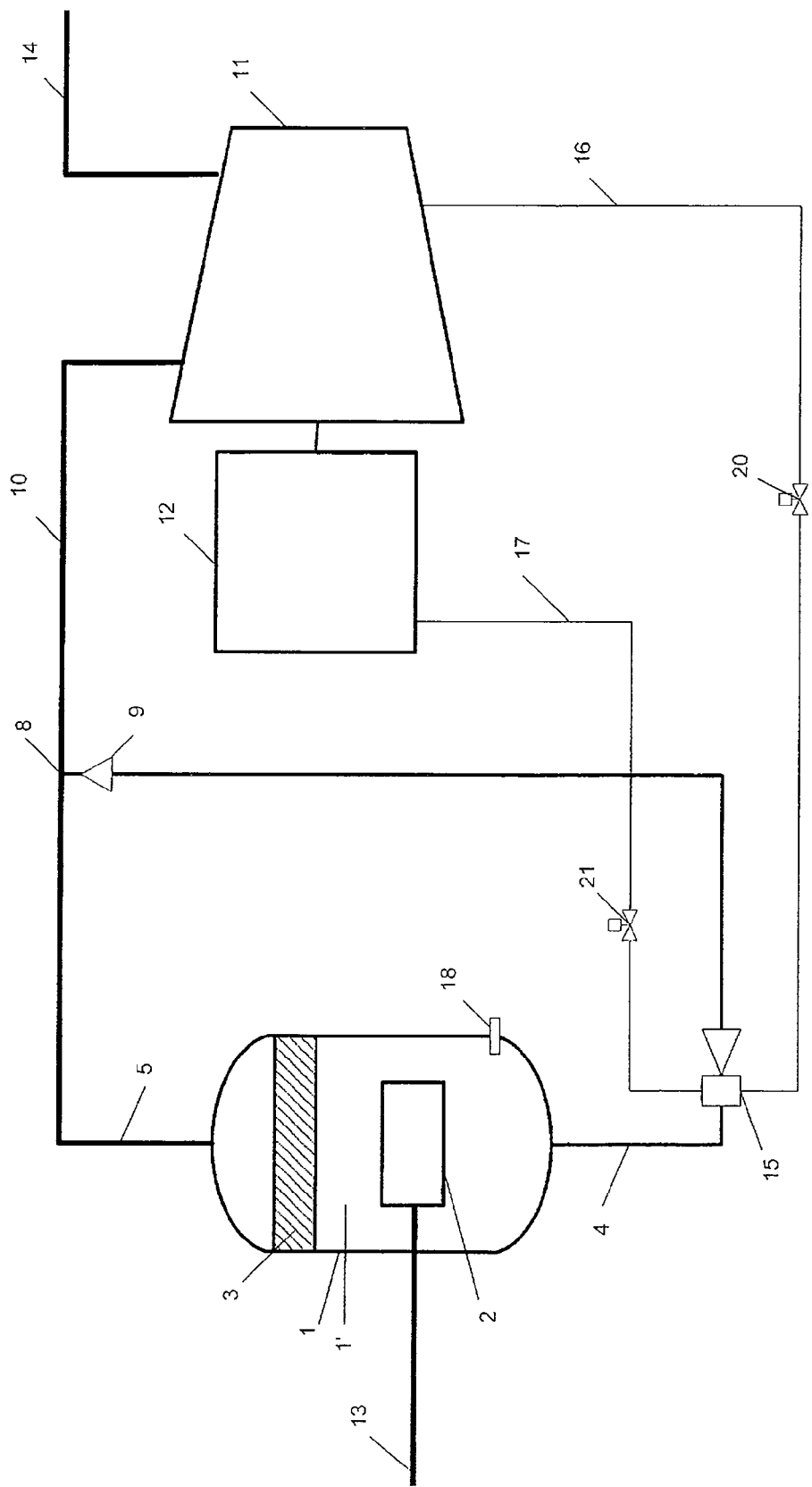
FIG. 3 shows a first example of the present system.
Figure 4:
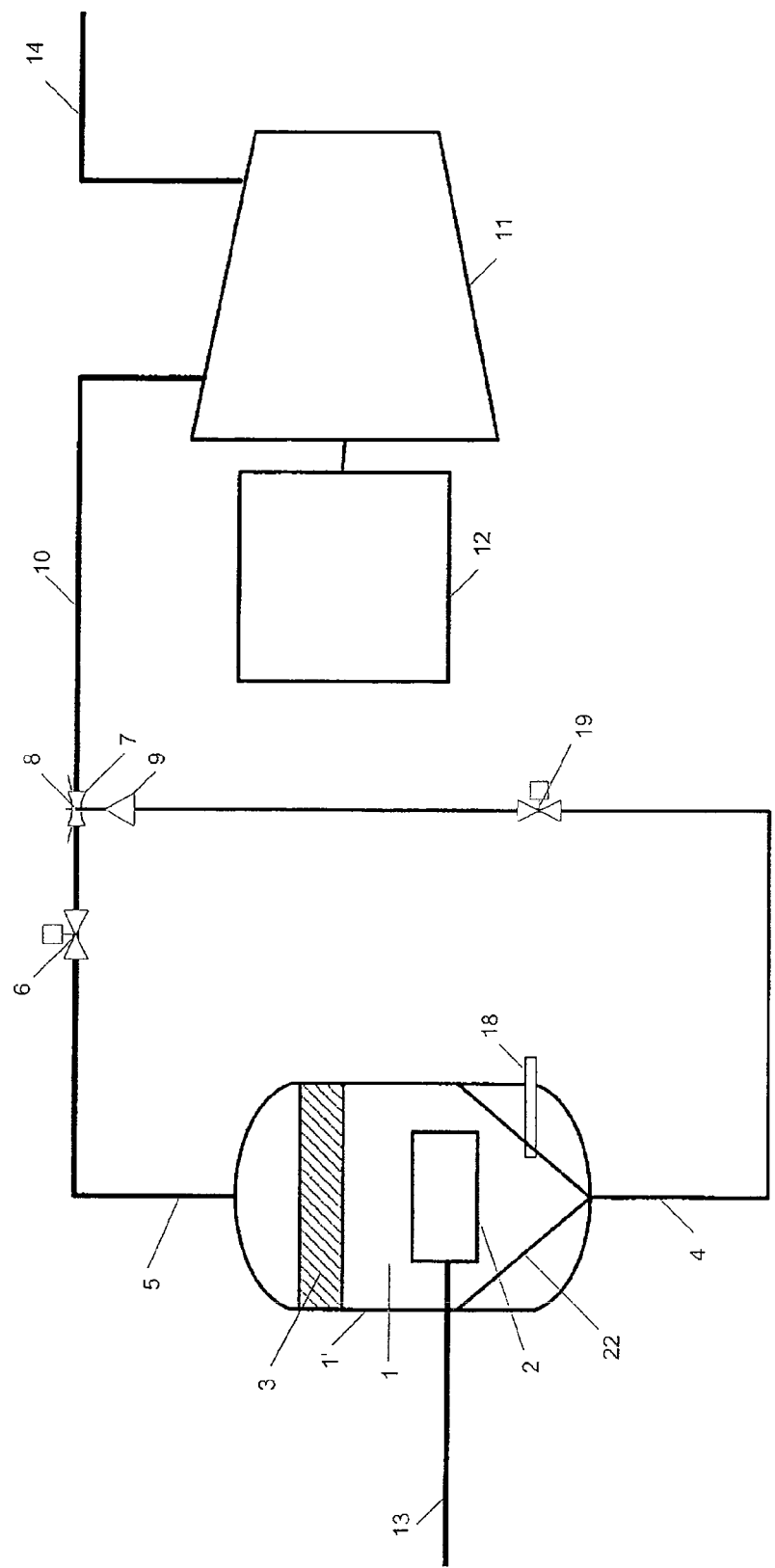
FIG. 4 shows a second example of the present system.
Figure 5:
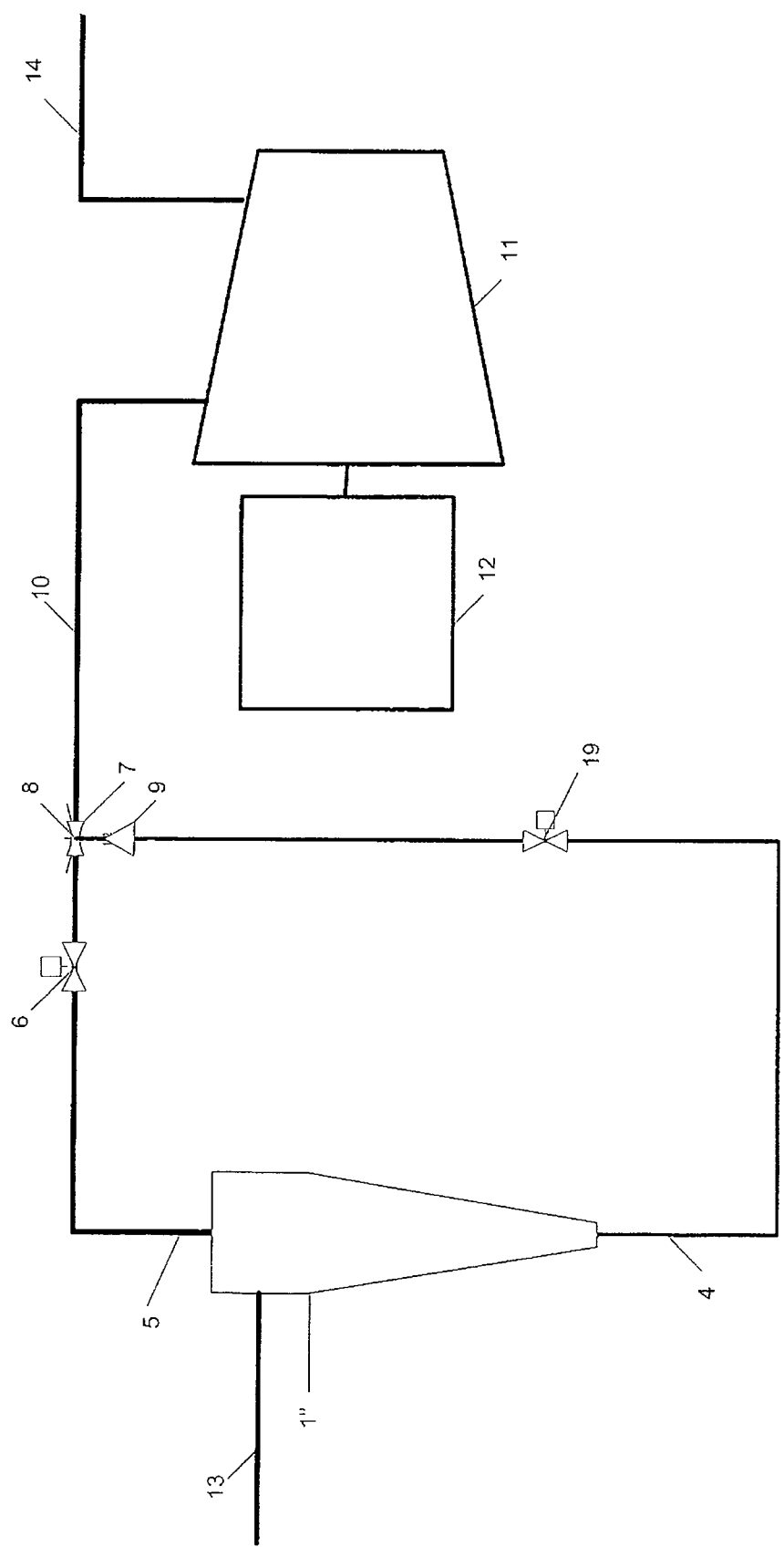
FIG. 5 shows a third example of the present system.

In FIG. 3, it is shown an embodiment of the invention in which a well flow is directed into a liquid separator 1' through an inlet pipe 13. The liquid separator consists of a container 1 and can have different internal equipment to increase the extent of liquid separation. Here, it is important to realize that the purpose of having the liquid separator in front of a well flow compressor is not high efficiency of the liquid separation but simply separating liquid lumps and droplets above a certain size which can cause so large wear of the compressor that it has an unacceptable short operational lifetime between necessary maintenance or repair. An inlet arrangement 2 can comprise anything from a pipe ending in the container 1 to a pall ring box, or different types of guide vanes, or equipment making the inflowing gas to rotate, e.g. cyclones. Such a inlet equipment functions by removing the pulse from the inflowing liquid, distributes the liquid across the crossection of the liquid separators 1' and separates droplets above a given size. The liquid separator 1' can have a single well flow inlet pipe which is terminated inside the liquid separator 1' in a longitudinal slit facing downwardly. In many cases, it is suitable simply having an inlet equipment to effect a sufficient droplet separation. A fine-cleaning equipment 3, i.e. a droplet catcher, in front of a gas outlet pipe 5 can comprise anything from deflecting separators, louvers, wire mats, fibre mats to multi-cyclones. In addition to dimensioning of the container 1, there is thus different types of inlet and outlet arrangements to be used resulting in that droplets above a certain diameter are not following the gas flow in overflow through a gas outlet pipe 5 and into a compressor 11. Sometimes, an empty container can deal with the task.

To pump the gas from the liquid separator 1', there is in FIG. 3 shown an embodiment using an ejector operated by compressed gas from an outlet of compressor s 11 or from one of its stages dependent on the pressure needed. The compressed gas is directed via a pipe 16 from the compressor and can optionally be adjusted by a control valve 20 to control the pumping effect. In some situations, compressed gas from one of the stages of the compressor 11 or its outlet is used to cool an electromotor 12 for the compressor. In such a case, the compressed cooling gas can be used to operate the ejector 15 by leading the cooling gas through a pipe 17 and an optional control valve 21. Then, the pipe 16 having the valve 20 is not needed. Due the flow of compressed gas through the ejector, separated liquid pumped in this manner is mixed with the gas and is fine-divided in droplets. How small droplets resulting therefrom depend on inter alia the pressure drop through the ejector, quantity of gas and configuration of the ejector. To enable better control of the largest droplet size, an atomizing nozzle 9 can be installed in front of a mixing point 8 at which the gas flow through the gas outlet pipe 5 run into the liquid from the gas outlet pipe 4. It is considered favourably that the atomizing nozzle 9 is as close as possible to the mixing point 8, whereby the gas with droplets runs into the gas flow from the gas outlet pipe 5 as fast as possible in the mixing point 8 which involves that the droplets get as little as possible duration and probability to merge before the mixing point. Then, the mixture of gas and fine-divided droplets flows through a compressor inlet pipe 10 into the compressor. Here, it is favourably that the mixing point 8 is as close as possible to an inlet of the compressor, i.e. that the compressor inlet pipe is short. If the compressor inlet pipe is 3 m and the gas with dispersed droplets has a flow velocity of 15 m/s, for instance, the retention period of the droplets within the compressor inlet pipe becomes 0.2 s and the probability for collisions and merging of larger droplets is low and without importance worth mentioning.

In its most simple form, there are not installed level sensors or level measuring equipment within the liquid separator 1' but the quantity of compressed gas operating the ejector 15 by means of the respective pipes 16, 17 is calculated in advance and the sys-tern is arranged in a fashion that is run with an empty tank. This involves that the pumping work effected by the ejector 15 is so large that there is not a liquid level within the container 1. Then, the pumping work with the ejector 15 can be set such that a given restricted quantity of gas is carried in the liquid outlet pipe 4 along with the liquid. If it should occasionally arrive larger liquid accumulations which involve a certain short-term liquid level within the container 1, this has no effect as long as the liquid level is not rising up to an inlet pipe 13 of the well flow or the inlet arrangement 2. To ensure this, the ejector should therefore be preset having some overcapacity as a safety factor.

To be able of adjusting the pumping work of the ejector 15 over a period, as the pressure in the well flow normally decreases, the actual gas quantity increases and the ratio of liquid to gas is changed, there can be installed a single liquid sensor 18 only signalling for liquid or not any liquid within the container 1 in a chosen distance above the liquid outlet pipe 4. If a liquid level is recorded by the sensor 18, the admission of compressed gas from the respective pipes 16, 17 and thereby the pumping work can be in-creased by opening the relevant control valves 20, 21. This can be made either by manual remote control of the valves 20, 21, or the adjusting function can be supplemented in an automatic adjusting system controlling the valves 20, 21. Either the adjusting is manual or automatic, it can follow a given strategy increasing the admission in intervals of 10%, for instance, until liquid no longer is recorded by the liquid sensor 18. A configuration of any more advanced type can have two or more level sensors above one another to provide for better grounds for decision-making for a setting of the pumping work of the ejectors 15.

In some cases, it can be chosen to install a level sensor 18 for continuous measuring within the liquid separator F. Such a level measuring equipment is known, e.g. pressure difference or nucleonic. To control the valves 20, 21 by continuously level reading by means of the level sensor 18, the level within the container 1 can be maintained between lower and upper limits. The motivation to use such a level control system can be caused by the fact that the liquid content of the well flow varies substantially, e.g. by slug flow or constant by large “surges”, and that a level adjustment retaining separated liquid in the container 1 distributes it during a certain period into the gas flow at the mixing point 8. In this manner, gas having large instantaneous values is prevented from flowing into the compressor 11.

In most situations, it is not necessary having continuous level measuring and control. The separated liquid can be allowed a certain necessary retention period to provide for a sufficient equalizing of the liquid content of the gas flowing into the compressor 11 from being separated within the liquid separator 1' until reaching the mixing point 8 by preadjusting the quantity of propellant gas to the ejector 15 relatively to the pressure drop and the length and diameter of the liquid outlet pipe 4 and the pressure drop through the optional atomizing nozzle 9. If the ejector is so set that the velocity of flow in the pipe 4 is 2 m/s and the length of pipe is 20 m, for instance, the retention period for the separated liquid amounts to 10 s which is considered to provide for sufficient equalization in the liquid content of the gas flow into the inlet of the compressor 11. With normal “surges” during operation, it is not necessary having any setting of a particular retention period for the liquid before arrival at the mixing point 8 because the liquid content of the well flow during operation at any moment is lower that the maximum allowable.

FIG. 4 shows another embodiment of the invention in which the separated liquid from the separator 1' is drawn through liquid outlet pipe 4 into the mixing point 8 at an under pressure created by a constriction 7 in the cross-section between the gas outlet pipe 5 and compressor inlet pipe 10. The constriction can be in the form of a convergent element in an end of the gas outlet pipe and also a divergent element inside an initial portion of the compressor inlet pipe, and the liquid outlet pipe 4 terminates between the convergent and divergent element as to generate an under pressure due to increased velocity within the narrower cross-section. The constriction can be contoured for a certain fixed under pressure ensuring emptied or approximately emptied container 1 at any moment. If an atomizer nozzle 9 is used, this must have such a construction also complying with the pressure drop therethrough.

Another way to effect that the separated liquid is directed from the container 1 to the mixing point 8 is having a choking, e.g. a choke valve 6 in front of the mixing point 8, whereby a sufficient pressure drop is created through the choking to draw the separated liquid at sufficient velocity from the container and that the pressure drop through a possible atomizer nozzle 9 is balanced. The choking can either be fixed or an adjustable valve 6. Also in connection with the invention according to FIG. 4 various forms of level sensing or continuously measuring can be used as described according to FIG. 3, and the level can correspondingly be controlled by adjusting the choking either remote-controlled manually or automatically.

In FIG. 4 and also applicable for the invention shown in FIG. 3, a lower portion of the liquid separator 1' is formed as a funnel 22 having a sufficient angle to allow that sand following the separated liquid is unable to accumulate and then fall down the outlet 4 and cause unwanted wear inside the compressor 11 when occurring, or in the worst cases are collected in quantities blocking the outlet of the container 1. As an alternative to the funnel formed outlet 22, a pipe, not illustrated, with compressed gas can be from the compressor outlet, or from one stage thereof, or in the form of cooling gas from the motor, and into the container, whereby the compressed gas in the form of directed jets against the bottom flushes out sand possibly being deposited. The flushing can occur continuously or at certain wanted intervals. Such a flushing can possibly be combined with a funnel formed outlet.

To eliminate the risk of sand accumulation, another solution can be provided for by flushing a lower portion of the liquid separator 1' with a hydrate inhibiting agent, e.g. MEG. At desired intervals it can be flushed large quantities MEG or another liquid into the liquid separator 1' and which are then atomized via the nozzle 9 before inflow into the compressor 11, whereby it can assist to clean the interior of the compressor by re-moving deposits.

In FIGS. 6 to 9, there are shown other embodiments according to the invention in which the embodiments mentioned above are supplemented with nozzles 9', 9" being located either in the gas outlet pipe 5 or compressor inlet pipe 10, or both in the gas outlet pipe and compressor inlet pipe. However, note that the components being illustrated in the previous figures are not present herein. In the different variants the respective atomizing nozzle is hence atomizing the liquid entrained in the flow through the gas outlet pipe or compressor inlet pipe. By the variant in FIG. 6 the atomizing nozzle 9 atomizes the separated liquid in the liquid outlet pipe 4, while the atomizing nozzle 9' atomize liquid entrained in the gas passing through the gas outlet pipe. By the embodiment in FIG. 8, there is occurring an atomization of the liquid entrained in the gas flow, both in the gas outlet pipe and compressor inlet pipe arranged in front of and after the mixing point 8.

Figure 10:
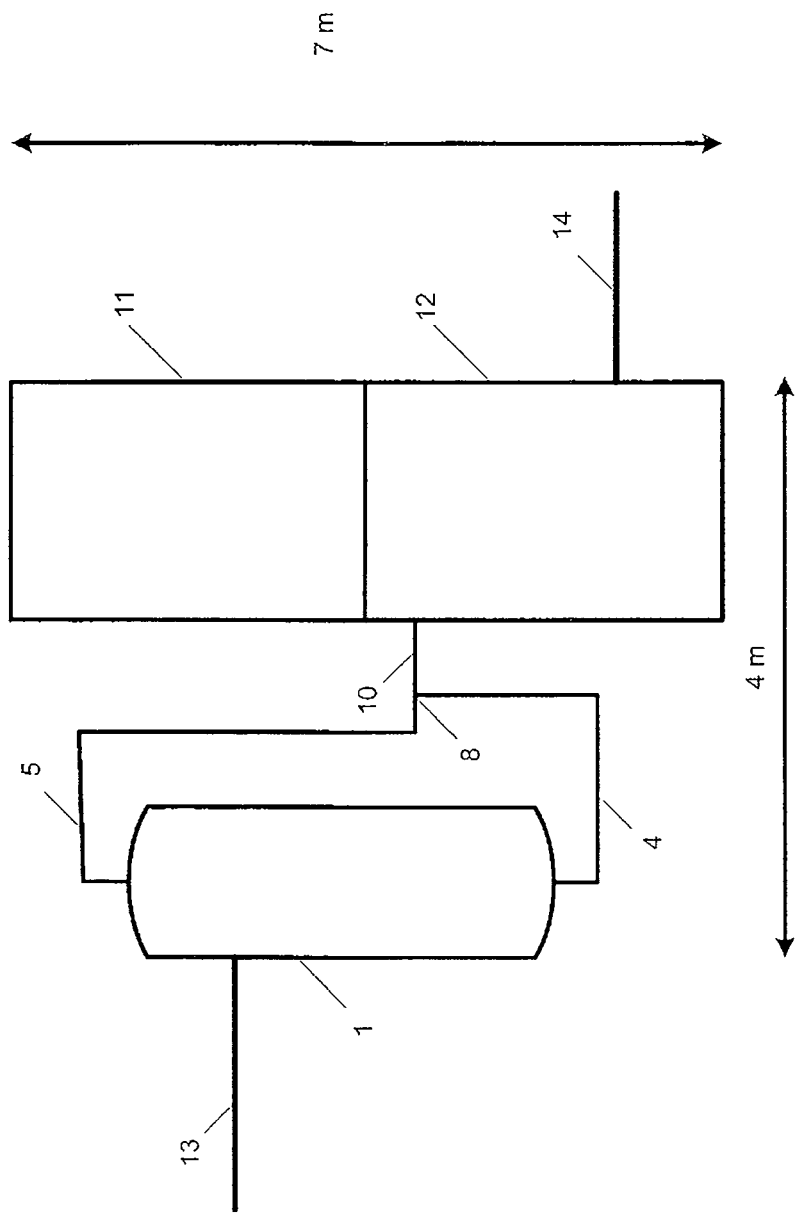
FIG. 10 shows a variant of the present invention.
Figure 11:
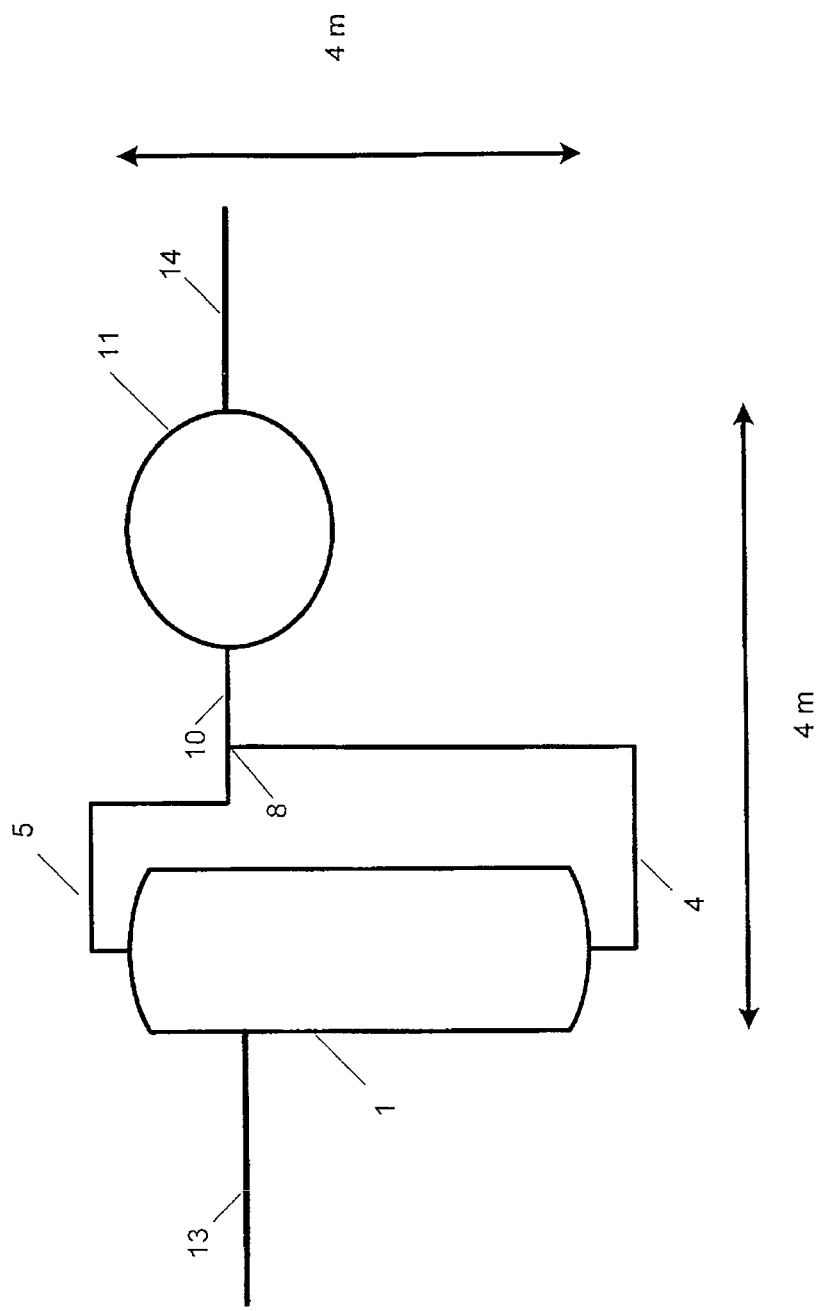
FIG. 11 shows an eighth embodiment of the present invention.

In FIG. 10, there is shown a variant of the invention in which the liquid separator is a cyclone 1". Cyclones can be constructed as to provided for a certain largest droplet diameter passing into the gas outlet pipe 5. If the gas quantity and density vary over time, more cyclones can be situated in parallel, whereby cyclones are phased in or out corresponding to demands to follow the conditions. Otherwise, the invention can be formed as mentioned in connection to the FIGS. 3 and 4.

Figure 6:
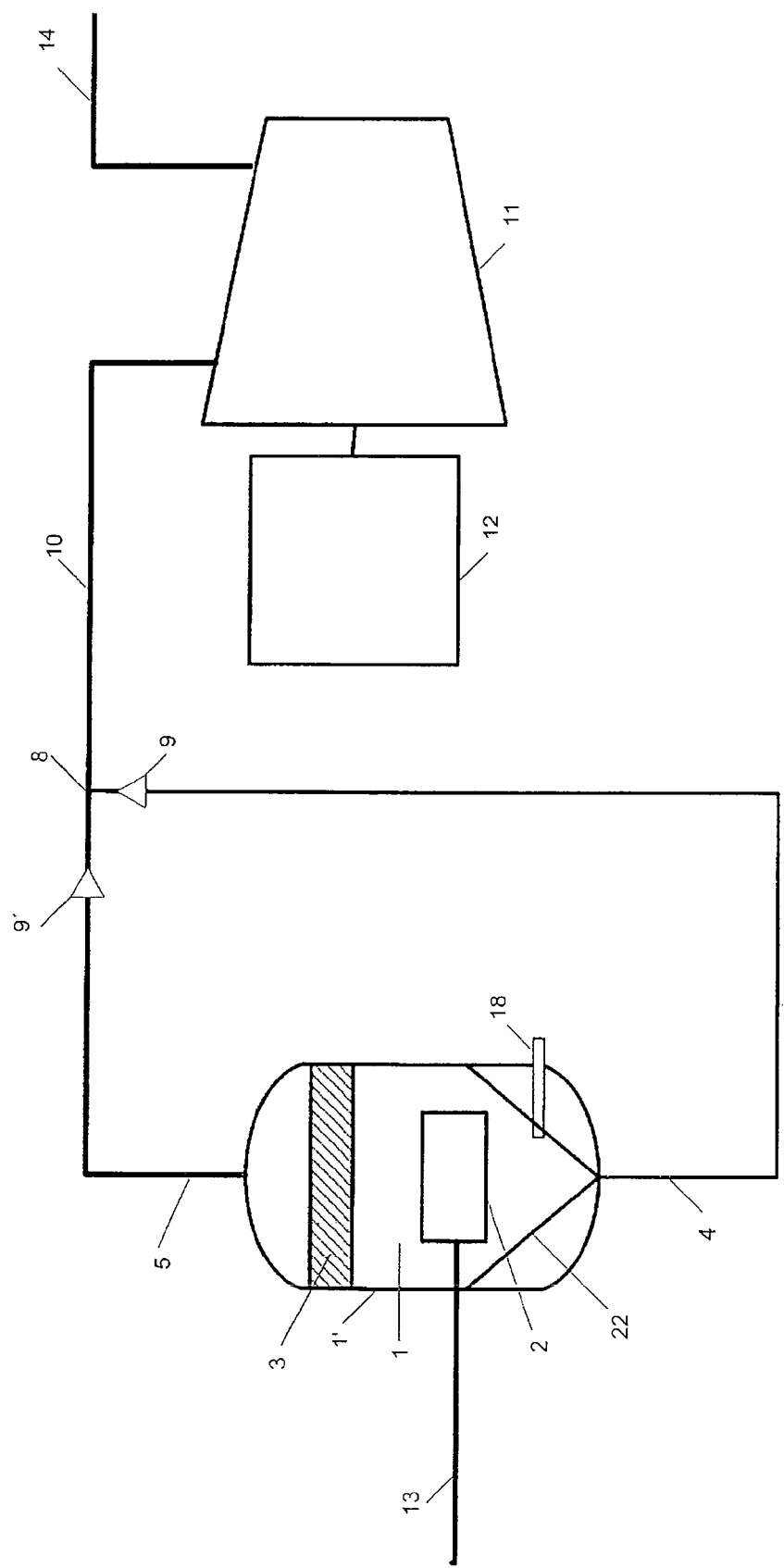
FIG. 6 shows a fourth example of the present system.
Figure 7:
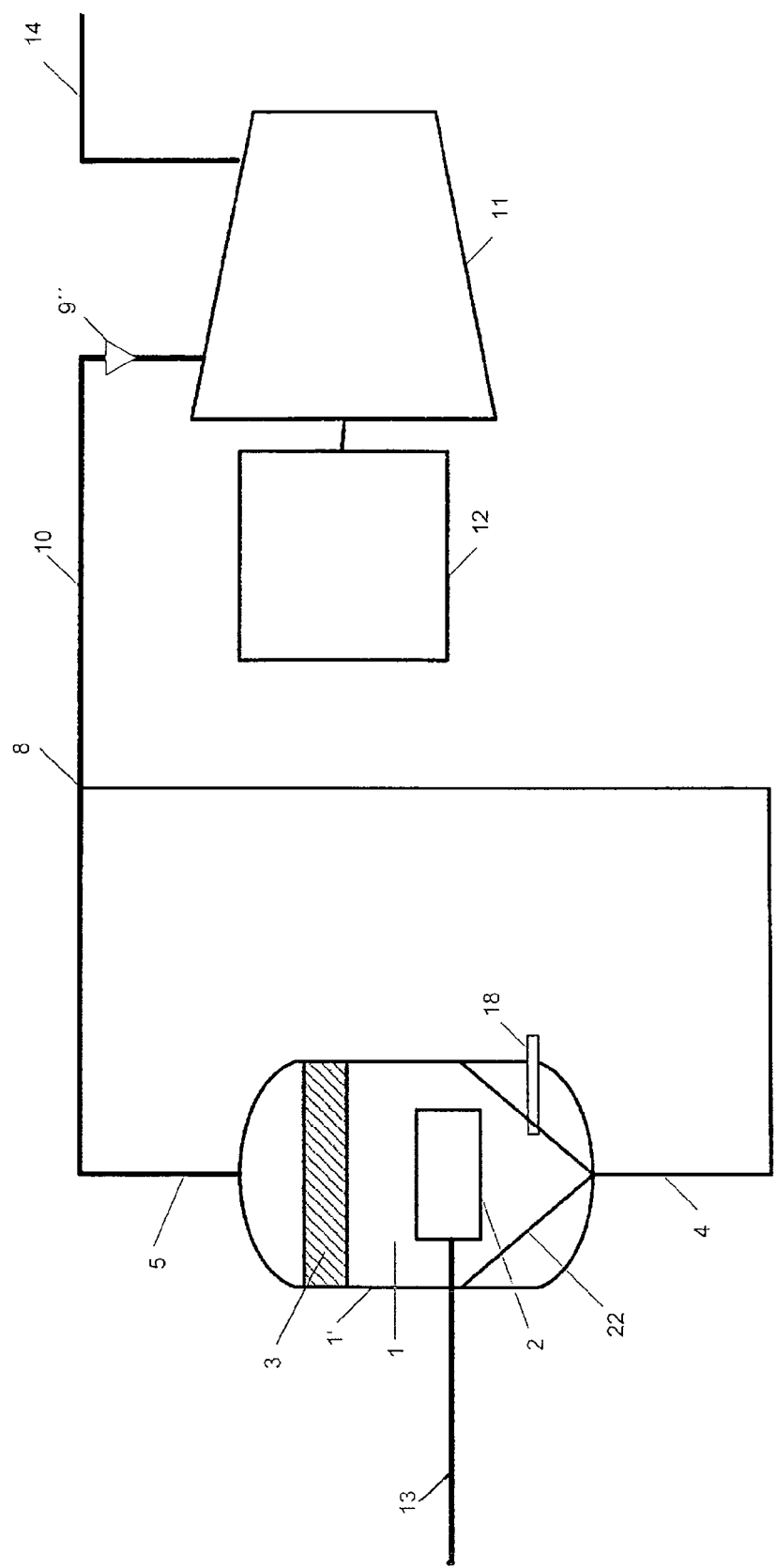
FIG. 7 shows a fifth example of the present system.
Figure 8:
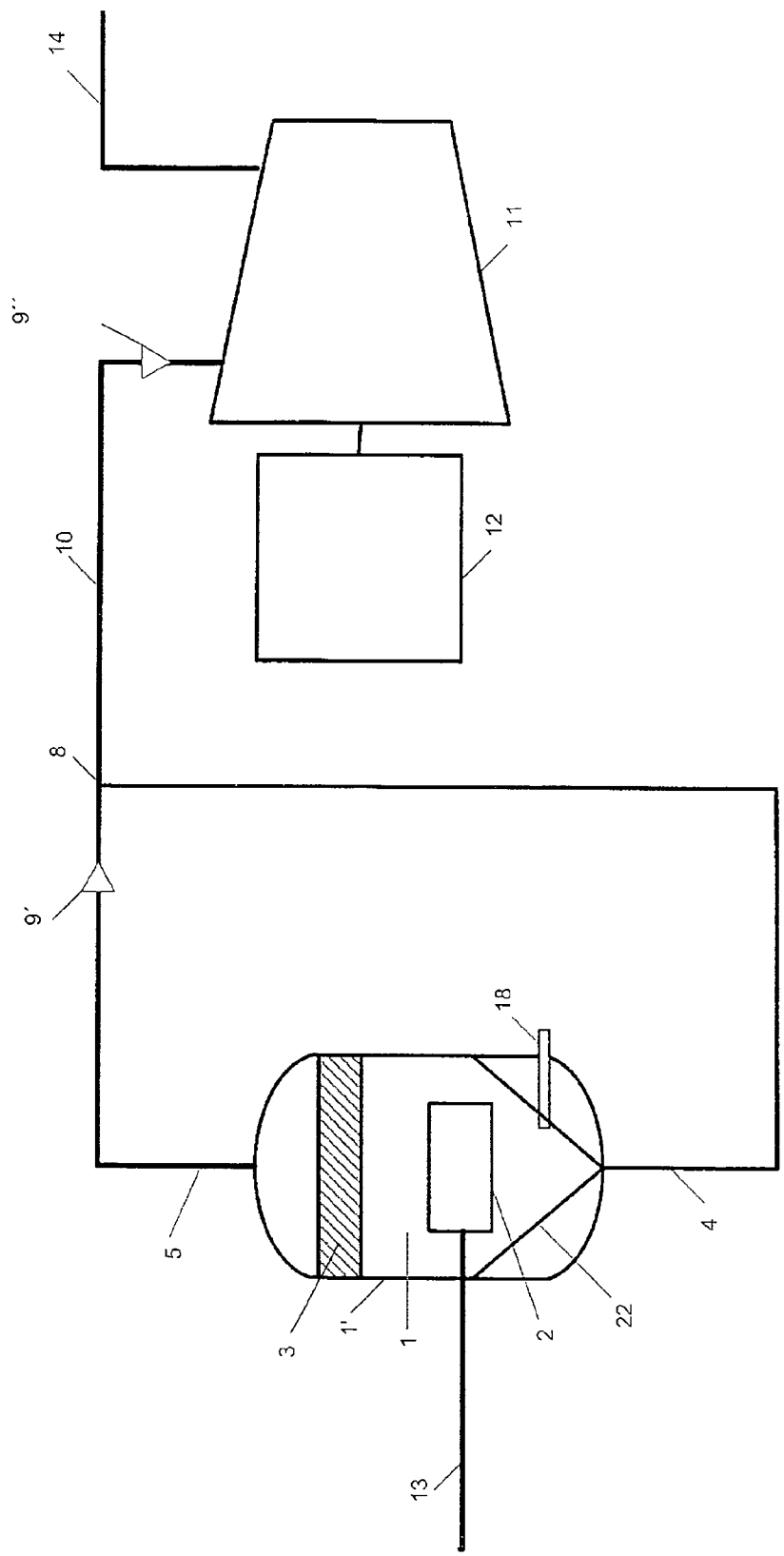
FIG. 8 shows a sixth example of the present system.
Figure 9:
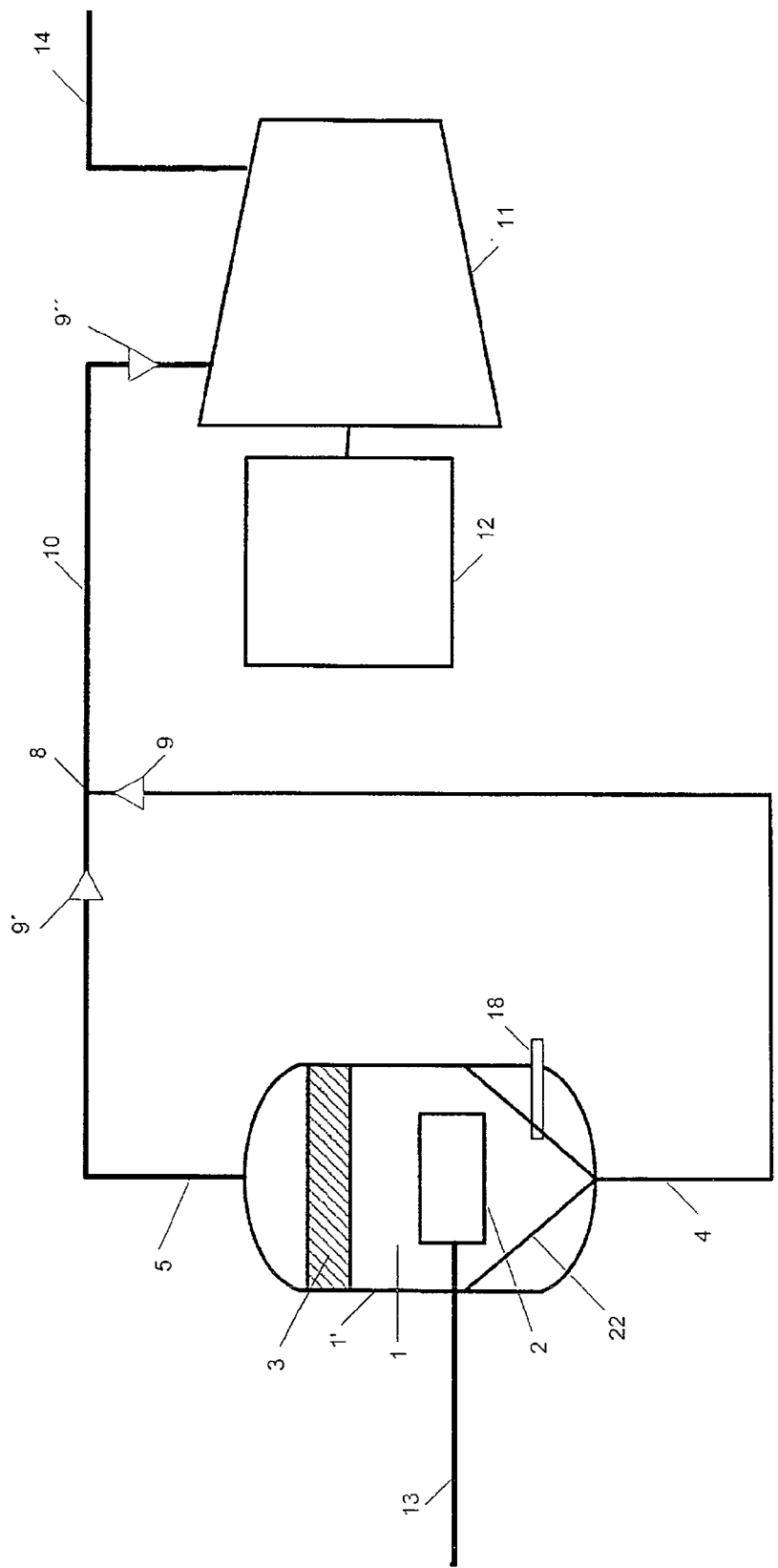
FIG. 9 shows a seventh example of the present system.

FIG. 10 is included to indicate the reduction of dimensions achieved relatively to the conventional compressor configuration having the separator and pump in FIGS. 1 and 2. In FIG. 6 the compressor with motor is arranged vertically. Correspondingly, it is indicated dimensions for a compressor with motor being horizontally situated in FIG. 11. Only components of interest for the dimensions are shown. For the arrangement from FIG. 10, it can be presupposed that it takes room within a width by depth by height of 4 by 4 by 7 m and correspondingly in FIG. 11 the extent is 4 by 4 by 4 m. The weight is reduced substantially as to a conventional configuration and the complexity as well, and increased reliability is achieved.

As the liquid separator 1' is small and light compared to the conventional solution, it is in most situations favourable not to have mechanical connectors in the compressor inlet pipe 10 between the liquid separator and compressor 11 but retrieving the entire arrangement when maintenance or repair is needed.

The invention claimed is:

1. A method of separating liquid from gas in a well flow when compressing the well flow in a device comprising a liquid separator having a well flow inlet pipe for the well flow, a gas outlet pipe to output a gas and a liquid outlet pipe to output a separated liquid, and a compressor for receiving the gas from the gas outlet pipe and compressing the gas, the method comprising:
   i) supplying all of the separated liquid from the liquid separator through the liquid outlet into the gas from the gas outlet pipe at a mixing point downstream of the liquid separator and upstream of the compressor;
   ii) mixing all of the separated liquid received from the liquid outlet pipe into the gas from the gas outlet pipe at the mixing point;
   iii) retaining separated liquid in the liquid separator for a retention period in case of liquid accumulation comprising surges or slugs in the well flow into the liquid separator, to avoid a liquid content of the gas into the compressor above a specified threshold;
   iv) atomizing the separated liquid upstream of or at an inlet to the compressor; and
   v) feeding all of the separated liquid and the gas into the compressor.

2. The method according to claim 1, further comprising pumping and dispersing the separated liquid from the liquid separator into droplets by means of an ejector arranged in the liquid outlet pipe.

3. The method according to claim 2, further comprising operating the ejector with compressed gas from any stage of the compressor, and supplying the compressed gas from the compressor to the ejector through a propellant gas pipe connected to any stage of the compressor or to an outlet of the compressor.

4. The method according to claim 3, further comprising supplying the pressurized gas to the ejector in a set quantity and at a set pressure to cause a set distribution of droplet size.

5. The method according to claim 3, further comprising arranging a control valve in the propellant gas pipe.

6. The method according to claim 5, further comprising operating the ejector using pressurized cooling gas from a compressor motor, and supplying the pressurized cooling gas from the compressor motor to the ejector through a cooling gas pipe.

7. The method according to the claim 6, further comprising providing a control valve in the cooling gas pipe.

8. The method according to claim 2, wherein the dispersing of the separated liquid from the liquid separator through the liquid outlet pipe comprises using a pipe restriction at the mixing point.

9. The method according to the claim 8, wherein the pipe restriction has a convergent part joined to the gas outlet pipe and a downstream divergent part joining the inlet of the compressor, and wherein the liquid outlet pipe terminates into the pipe restriction at a location between the convergent part and the divergent part.

10. The method according to claim 8, further comprising providing a control valve in the gas outlet pipe upstream of the mixing point.

11. The method according to claim 8, further comprising providing a control valve in the liquid outlet pipe.

12. The method according to claim 1, wherein an atomizer nozzle is arranged in at least one of the liquid outlet pipe, the gas outlet pipe and the inlet to the compressor.

13. The method according to claim 5, further comprising adjusting the control valve based on a reading of a signal from at least one level sensor or level meter for the separated liquid inside the liquid separator.

14. The method according to claim 1, wherein the liquid separator includes a lower funnel formed portion.

15. The method according to claim 1, wherein the liquid separator includes at least one cyclone.

16. The method according to claim 1, further comprising arranging an atomizing nozzle in the liquid outlet line.

17. The method according to claim 1, further comprising providing the well flow to the liquid separator via a single well flow inlet pipe that is arranged to terminate inside the liquid separator.

18. The method according to the claim 17, wherein the well flow inlet pipe terminates in a longitudinal slit facing downwardly.

19. The method according to claim 17, wherein the well flow inlet pipe that terminates inside the liquid separator causes pulse elimination from, cross-sectional distribution of, or some droplet separation from, inflowing liquid.

20. The method according to the claim 17, wherein the well flow inlet pipe includes a pall ring box, guide vanes, gas rotation equipment, and at least one cyclone.

21. The method claim 1, further comprising fine-cleaning or droplet separation within the liquid separator upstream of the gas outlet pipe.

22. The method according to the claim 21, wherein the fine-cleaning or droplet separation uses one or more of:
   a deflection separator, louvers, wire mats, fiber mats, or multi-cyclones.

* * * * *